United States Patent
Niranjan

(10) Patent No.: US 12,218,914 B2
(45) Date of Patent: Feb. 4, 2025

(54) POLICY-BASED DYNAMIC VPN PROFILE SELECTION USING DNS PROTOCOL

(71) Applicant: Infoblox Inc., Santa Clara, CA (US)

(72) Inventor: Raghavendra Singh Niranjan, Bengaluru (IN)

(73) Assignee: Infoblox Inc., Santa Clara, CA (US)

( * ) Notice: Subject to any disclaimer, the term of this patent is extended or adjusted under 35 U.S.C. 154(b) by 290 days.

(21) Appl. No.: 17/746,814

(22) Filed: May 17, 2022

(65) Prior Publication Data
US 2023/0379304 A1    Nov. 23, 2023

(51) Int. Cl.
*H04L 9/40* (2022.01)
*H04L 61/4511* (2022.01)

(52) U.S. Cl.
CPC ...... *H04L 63/0272* (2013.01); *H04L 61/4511* (2022.05); *H04L 63/0236* (2013.01)

(58) Field of Classification Search
None
See application file for complete search history.

(56) References Cited

U.S. PATENT DOCUMENTS

2018/0309658 A1* 10/2018 Parla .................. H04L 45/54
2022/0385474 A1* 12/2022 Helfinstine ............ H04L 9/40

OTHER PUBLICATIONS

Damas et al., Extension Mechanisms for DNS (EDNS(0)), RFC 6891—Extension Mechanisms for DNS (EDNS(0)), Apr. 2013.
Gentile et al., A Survey on the Implementation and Management of Secure Virtual Private Networks (VPNs) and Virtual LANs (VLANs) in Static and Mobile Scenarios, Telecom 2021, vol. 2, pp. 430-445.
Harchay et al., An Enhanced Traffic Split Routing Heuristic for Layer 2 and Layer 1 Services, (IJACSA) International Journal of Advanced Computer Science and Applications, vol. 13, No. 1, 2022 (downloaded May 5, 2022).
Lana Ibrahim, Virtual Private Network (VPN) Management and IPSec Tunneling Technology, Middle East Comprehensive Journal For Education and Science Publications ( MECSJ ), Issue (1), Jan. 2017, pp. 76-87.
Liu et al., Avoiding VPN Bottlenecks: Exploring Network-Level Client Identity Validation Options, 2021.

* cited by examiner

*Primary Examiner* — Syed A Roni
(74) *Attorney, Agent, or Firm* — Van Pelt, Yi & James LLP

(57) ABSTRACT

Techniques for policy-based dynamic VPN profile selection using DNS protocol are provided. In some embodiments, a system/process/computer program product for policy-based dynamic VPN profile selection using DNS protocol includes receiving, at a DNS server for an enterprise network, a Domain Name System (DNS) request for a resource from an endpoint client; determining an IP address and an authentication token for the endpoint client to access the resource using a secure tunnel; and sending a DNS response, from the DNS server, including the IP address and the authentication token to the endpoint client.

17 Claims, 10 Drawing Sheets

| User | FQDN | VPN GW IP | Transport | Auth Cookies | Client ID |
|---|---|---|---|---|---|
| mranjan@infoblox.com | outlook.com, netflix.com, amazon.in | 172.215.25.206 | TLS | 9caca7db99818eec | b1a011e8328f75e7233db3c2a6d9c217 |
| mranjan@infoblox.com | facebook.com, cnn.com | 157.240.225.235 | ESP | 1cabc9ee9f858cde | b1a011e8328f75e7233db3c2a6d9c217 |

FIG. 3

> Frame 8: 199 bytes on wire (1592 bits), 199 bytes captured (1592 bits) on interface en0, id 0
> Ethernet II, Src: Apple_da:8b:cb, (14:7d:da:da:8b:cb), Dst: 72:7d:e6:93:87:38 (72:7d:e6:93:87:38)
> Internet Protocol Version 4, Src: 192.168.0.155, Dst: 192.168.0.128
> User Datagram Protocol, Src Port: 5559, Dst Port: 35830
∨ Domain Name System (response)
    Transaction ID: 0xf1ab
> Flags: 0x8180 Standard Query response, No error
    Questions: 1
    Answer RRs: 2
    Authority RRs: 0
    Additional RRs: 1
> Queries
> Answers
∨ Additional records
    ∨ <Root>: type OPT
        Name: <Root>
        Type: OPT (41)
        UDP payload size: 4096
        Higher bits in extended RCODE: 0x00
        EDNS0 version: 0
       ∨ Z: 0x0000
          0............ = DO bit: Cannot handle DNSSEC security RRs
          .000 0000 0000 0000 = Reserved: 0x0000
        Data length: 48
       > Option: COOKIE
          Option Code: COOKIE (10)
          Option Length: 8
          Option Data: 9daca7db9981d98e
          Client Cookie: 9daca7db9981d98e
          Server Cookie: <MISSING>   — 402
       ∨ Option: Unknown (65518)
          Option Code: Unknown (65518) ⟶ VPN Policy ID
          Option Length: 13 ⟶ VPN Policy data length
          Option Data: 9dff0e42302 1cabc9ee9f858cde ⟶ VPN Policy data, first 4 byte will be the IP address of VPN GW, next 1 byte will tell the VPN transport mode (01 : TLS, 00 : ESP), next 8 byte will be the VPN GW Auth cookies which client will use to authenticate itself.   — 404

FIG. 4

POLICY-BASED DYNAMIC VPN PROFILE SELECTION USING DNS PROTOCOL

BACKGROUND OF THE INVENTION

Domain Name System network services are generally ubiquitous in Internet Protocol (IP)-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRAWINGS

Various embodiments of the invention are disclosed in the following detailed description and the accompanying drawings.

FIG. 3 is an example of a policy for VPN split tunneling in accordance with some embodiments.

FIG. 4 illustrates a DNS response with VPN policy information in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names (FQDNs)). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain (e.g., an NX Domain response is returned by DNS servers for a non-existent domain).

Figure 1:
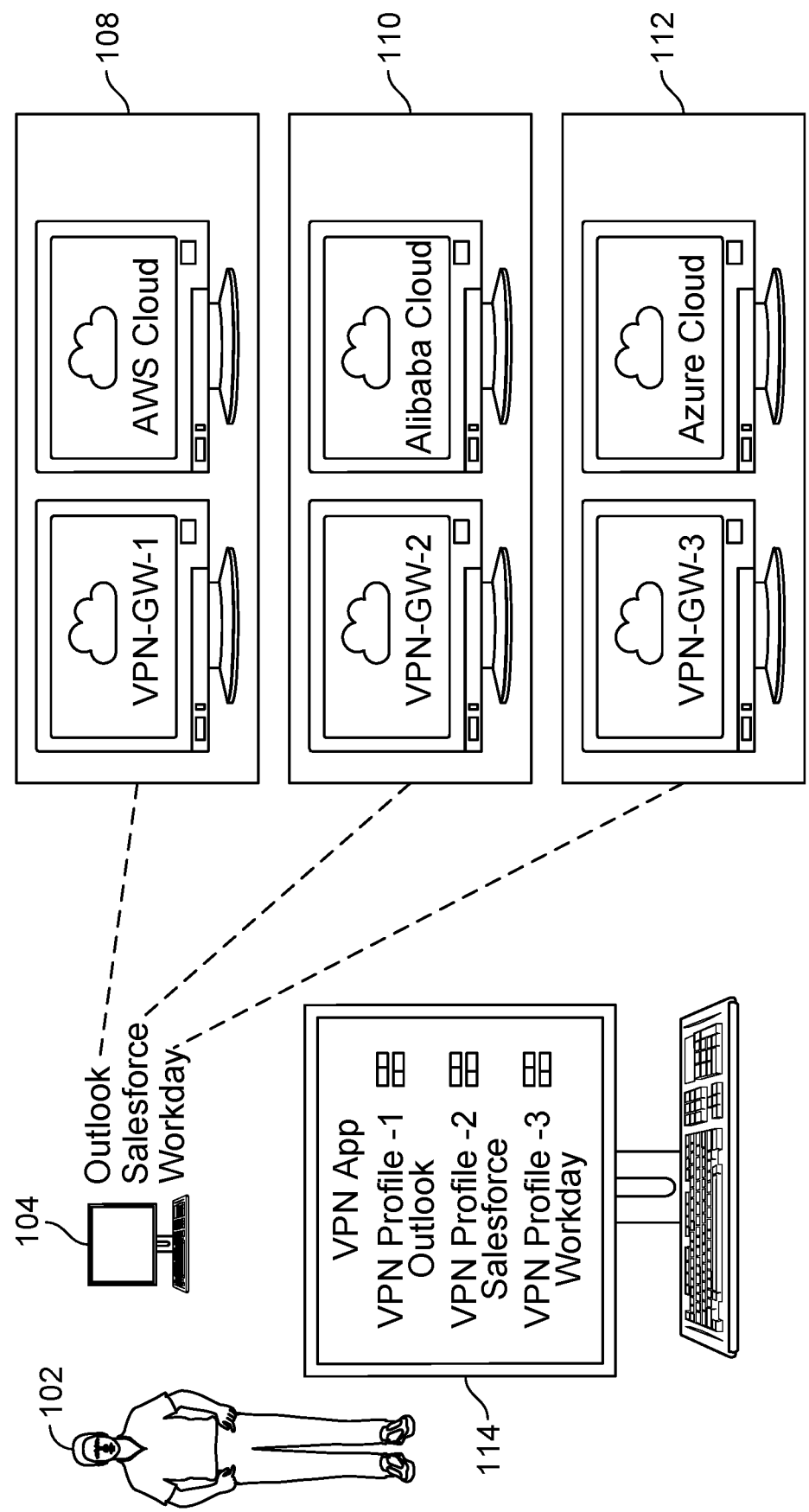
FIG. 1 illustrates an example enterprise network environment that utilizes multiple cloud-based services that users access via. Virtual Private Network (VPN) gateways.

FIG. 1 illustrates an example enterprise network environment that utilizes multiple cloud-based services that users access via VPN gateways. In a typical enterprise network environment, a user must connect to different VPN gateways for each cloud-based service, such as for AWS cloud, Alibaba cloud, and Azure cloud. Moreover, there typically are distinct profiles for each distinct cloud-based software service, such as Outlook, Salesforce, and Workday.

Conventional VPNs typically provide secure access by using distinct profiles to access each protected resource that is hosted on different infrastructure, such as shown in FIG. 1. Referring to FIG. 1, a corporate user 102 has three applications (i.e., Outlook, Salesforce. and Workday as shown in FIG. 1) configured in an endpoint device 104. Each of these applications has an application/edge server running in three different clouds, such as an Outlook application server hosted in an AWS cloud as shown at 108, a Salesforce application/edge server hosted in an Alibaba cloud as shown at 110, and a Workday application/edge server hosted in an AZUR cloud as shown at 112. In order to access each of these applications, the user must typically configure three VPN profiles in a VPN application 114. As such, each time the user switches between these applications, the user needs to disconnect the current profile and connect the different profile. In this example, the VPN application does not provide smart logic that facilitates dynamically switching between these profiles at runtime.

What is needed are new and improved solutions to facilitate split tunneling and can route traffic to the appropriate VPN gateway at runtime using the corresponding VPN profile.

In addition, load balancing presents another technical challenge for routing traffic to such VPN gateways. For example, if an application/edge server is being securely accessed by a VPN GW, then during load balancing operations, the VPN application typically needs to re-authenticate or re-provision in order to obtain a new VPN gateway IP address as the application cannot use the previously stored VPN GW IP address as it may not be able to serve any new connections.

Also, expiration of authentication credentials, such as authentication cookies or authentication tokens will also typically force a user to re-connect the VPN profile.

Moreover, mobile devices (e.g., mobile devices executing the Android operating system (OS) and the Apple iOS) generally have a limitation that at one time only one application can use the VPN attribute provided by the OS. As such, if the mobile endpoint VPN application uses the VPN attribute (e.g., to capture the DNS traffic of the device), then the user cannot use any other VPN app on the mobile device simultaneously.

Overview of Policy-Based Dynamic VPN Profile Selection Using DNS Protocol

Thus, new and improved techniques are needed for policy-based dynamic VPN profile selection on computing networks (e.g., enterprise networks).

Accordingly, new techniques for policy-based dynamic VPN profile selection using DNS protocol are disclosed.

In some embodiments, a system/process/computer program product for policy-based dynamic VPN profile selection using DNS protocol includes receiving, at a DNS server for an enterprise network, a Domain Name System (DNS) request for a resource from an endpoint client; determining an IP address and an authentication token (e.g., an authentication (auth) cookie) for the endpoint client to access the resource using a secure tunnel; and sending a DNS response, from the DNS server, including the IP address and the authentication token to the endpoint client.

For example, the IP address and the authentication token can be determined based on a policy for dynamic VPN profile selection using the DNS protocol to facilitate DNS-based split tunneling. The policy can include a plurality of VPN rules that can be updated at runtime for dynamic VPN gateway allocation for endpoint clients associated with the enterprise network.

In some embodiments, a system/process/computer program product for policy-based dynamic VPN profile selection using DNS protocol further includes fetching the IP address and the authentication token from an endpoint server, wherein the authentication token is generated at the endpoint server for each new session associated with the endpoint client. As such, VPN split tunneling can be performed using the existing DNS protocol (e.g., including the eDNS options as further described below with respect to various embodiments). In this example, new authentication tokens can be issued each time the endpoint client initiates a new session for accessing the resource. Moreover, the dynamic updating of the VPN rules in the policy can facilitate load balance across VPN gateways for accessing the resource, such as will be further described below.

In some embodiments, an endpoint server is provided for generating authentication tokens and storing the policy for dynamic VPN profile selection using the DNS protocol to facilitate DNS-based split tunneling. The DNS server can be configured to communicate with the endpoint server using an application programming interface (API), as will also be further described below. As such, the endpoint is not required to be configured with the policy information. Moreover, the endpoint client is not required to execute an endpoint agent to generate such authentication tokens.

In an example implementation, the policy can also be configured to include geography/location and/or time-based settings. For example, users in the United States, Europe, and Asia can be configured to use distinct VPN gateways to access the resource. Another example is the expiration of the authentication token (e.g., a time to live (TTL) setting can be included in the eDNS options).

For example, the disclosed techniques for policy-based dynamic VPN profile selection using DNS protocol can be implemented to enhance and improve an endpoint client (e.g., BloxOne endpoint client that is commercially available from Infoblox Inc. or another endpoint client) to add VPN functionality and filter the device traffic based on a configured policy, such as will be further described below.

These and other embodiments and examples for performing policy-based dynamic VPN profile selection using DNS protocol will be further described below.

Figure 2:
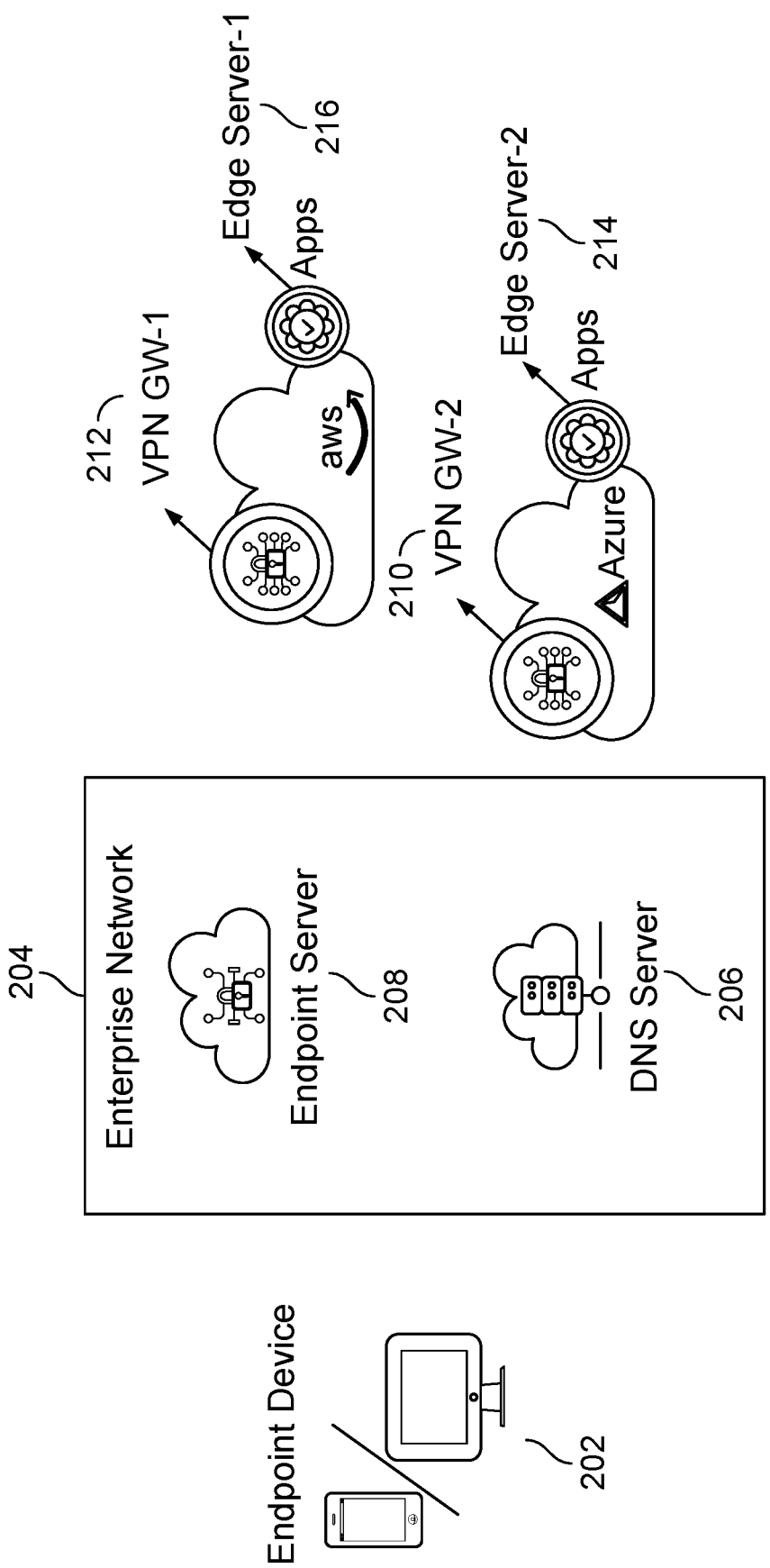
FIG. 2 is a network diagram illustrating a system environment for performing policy-based dynamic VPN profile selection using DNS protocol in accordance with some embodiments.

System Embodiments for Policy-Based Dynamic VPN Profile Selection Using DNS Protocol FIG. 2 is a network diagram illustrating a system environment for performing policy-based dynamic VPN profile selection using DNS protocol in accordance with some embodiments. As shown, an endpoint device (e.g., a mobile device, laptop/desktop computer, or other network capable computing device) is in network communication with an enterprise network 204. Enterprise network 204 includes a DNS server 206 and an endpoint server 208. In this enterprise network environment, the endpoint device can connect to two different cloud-based services via VPN gateways 210 and 212 to access distinct applications via edge server-2 shown at 214 and edge server-1 shown at 216, respectively. In this example, it is assumed that the provider hosting for the VPN Gateway and the VPN client is the same (e.g., Infoblox as the VPN provider, and Infoblox as the provider of the host VPN Gateway and VPN client).

In this example, endpoint device 202 can connect to each of the distinct VPN gateways 210 and 212 using distinct VPN profiles for each, respectively, without requiring that the distinct VPN profiles be configured and/or stored on endpoint device 202.

Rather, in some embodiments, the VPN profiles are configured and stored on endpoint server 208. DNS server 206 is configured to look up the VPN profiles in response to a DNS request from endpoint device 202 and provide the appropriate VPN gateway IP address as well as an authentication token (e.g., authentication cookie) as part of the DNS response from the DNS server to the endpoint device to facilitate split tunneling based on a policy-based dynamic VPN profile selection using DNS protocol (e.g., VPN client can then function in a split tunneling mode) as will be further described below.

FIG. 3 is an example of a policy for VPN split tunneling in accordance with some embodiments. In some embodiments, endpoint server 208 and DNS server 206 are configured to share a data store (e.g., a database, such as a Redis, MySQL or other forms of open source or commercially available databases). In an example implementation, the data store is stored on endpoint server 208, and DNS server 206 is configured to perform a lookup via network communications with the endpoint server.

Referring to FIG. 3, the data store includes user specific VPN policies (e.g., VPN rules), as shown in table 300. The table includes a user field as shown at 302 for each user of the enterprise (e.g., identified by email address as shown in this example, but other user identity (ID) information can similarly be used). The table also includes an FQDN field 304 for each configured resource identified by its respective Fully Qualified Domain Name (FQDN). The table further includes a VPN gateway IP field 306 that is the configured IP address for the VPN gateway for accessing the resource at the associated Fully Qualified Domain Name (FQDN) that is stored in the FQDN field, and a transport field 308 for the secure protocol to be used when accessing the VPN for the associated resource. In addition, the table includes an authentication (auth) cookies field 310 for storing auth tokens for the associated user to access the resource (e.g., the auth cookies can be implemented as 8-byte randomly generated numbers or some other form of unique/randomly generated information can be used for such auth cookies). Finally, the table includes a client identifier (ID) 312 for uniquely identifying the client/endpoint device associated with the user (e.g., the client ID can be implemented as a 16-byte or 32-byte randomly generated number that can be assigned to the client/user as unique identifier, for example, the client/endpoint device can be assigned to a client ID by an entity, such as a CSP (Customer Service Portal), or some other form of unique/randomly generated information can be used for such client IDs).

In this example, in response to a new DNS request with client id "b1a011e8328f75e7233db3c2a6d9c217" from endpoint client/device 202 sends, DNS server 206 receives the DNS request and then is configured to perform a lookup in data store 300 that is stored in endpoint server 208 to check the data store and fetch the VPN split tunneling policy. If the DNS request includes the FQDN that matches an FQDN stored in the data store, then the endpoint server returns the corresponding VPN split tunneling policy information (e.g., including the VPN GW IP address, transport, and auth cookie) to the DNS server. The DNS server then sends the fetched VPN split tunneling policy information to the endpoint client/device in the DNS response, which can be provided, in this example implementation as part of the eDNS options (e.g., the Extension Mechanisms for DNS (EDNS) is a specification, which is publicly available at https://datatracker.ietf.org/doc/html/rfc6891, for expanding the size of several parameters of the Domain Name System (DNS) protocol, which previously had size restrictions that the Internet engineering community deemed too limited for increasing the functionality of the DNS protocol).

FIG. 4 illustrates a DNS response with VPN policy information in accordance with some embodiments. As shown, the DNS response includes the VPN policy information (e.g., VPN rule data) as part of the eDNS options. Specifically, the VPN policy information included in the DNS response includes an 8-byte cookie as shown at 402. The DNS response also includes a VPN policy ID, VPN policy data length, and VPN policy data as shown at 404. As shown, the first four bytes of the VPN policy data are used for the IP address of the VPN gateway, the next one byte is used for the VPN transport mode (e.g., 01 for TLS and 00 for ESP, in which this field is used to tell the client what mode of communication should be used for data transfer), and the next eight bytes are used for the VPN GW auth cookie that the client can use to authenticate itself with the VPN GW as will be further described below.

Figure 5:
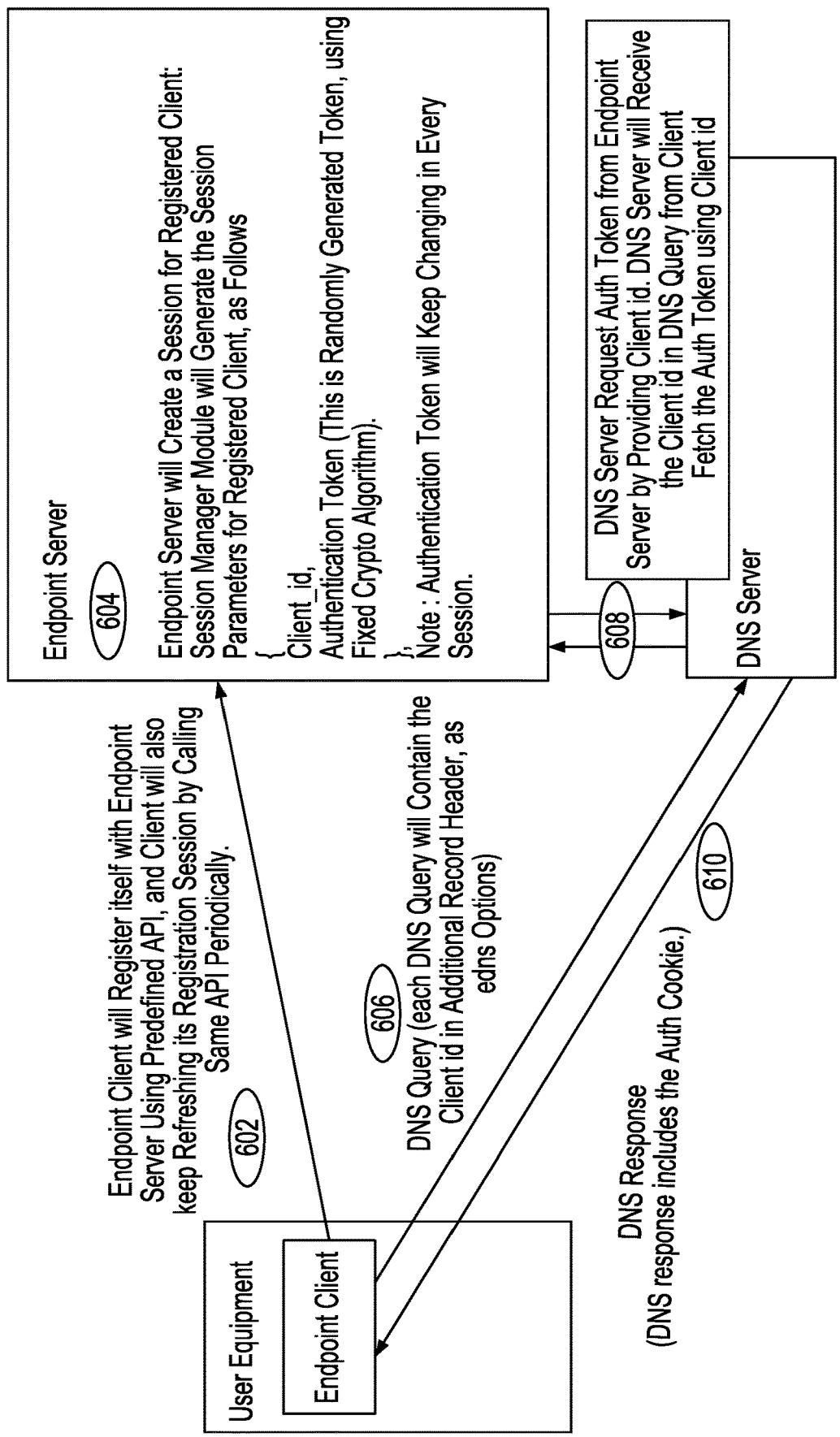
FIG. 5 is a block diagram illustrating logic for generating an authentication cookie in accordance with some embodiments.

FIG. 5 is a block diagram illustrating logic for generating an authentication cookie in accordance with some embodiments. Specifically, the logic for generating an authentication cookie (e.g., an example implementation at a high-level and where such logic resides, e.g., in the endpoint server) is illustrated in FIG. 5.

Referring to FIG. 5, at 502, the endpoint client (e.g., user equipment (UE), such as endpoint client/device 202 as shown in FIG. 2) registers itself with the endpoint server (e.g., endpoint server 208 as shown in FIG. 2). In this example implementation, the endpoint client uses a predefined application programming interface (API) to register with the endpoint server (e.g., and the client can also keep refreshing its registration session by calling the same API periodically).

At 504, the endpoint server will create a session for the registered endpoint client. In this example implementation, a session manager module can generate the session parameters for the registered endpoint client as shown in FIG. 5. Also, in this example, the authentication token is generated/created new for each new session for the endpoint client (e.g., each session associated with the client will have a distinct authentication token).

At 506, a new DNS Query (e.g., each DNS query will contain the client id in additional record header, as eDNS options) is sent from the endpoint client to the DNS server (e.g., DNS server 206 as shown in FIG. 2). As similarly described above, the eDNS options can be used for providing additional information as further described below.

At 508, the DNS server requests an authentication (auth) token from the endpoint server by providing a client ID. The DNS server receives the client ID in the DNS query from the client (e.g., extracted from information included in the eDNS options as similarly described above). In response, the endpoint server performs a lookup in a data store maintained at the endpoint server to fetch the auth token using the client ID.

At 510, the DNS server sends a DNS Response to the endpoint client. The DNS Response includes the authentication (auth) cookie (e.g., the auth cookie, as well as the VPN gateway IP address, and tunnel mode (TLS or ESP), can be included in the eDNS options as similarly described above). As will now be further described below, the endpoint client can use the auth cookie to securely access the external resource (e.g., applications/services, such as cloud-based applications/services).

Figure 6A:
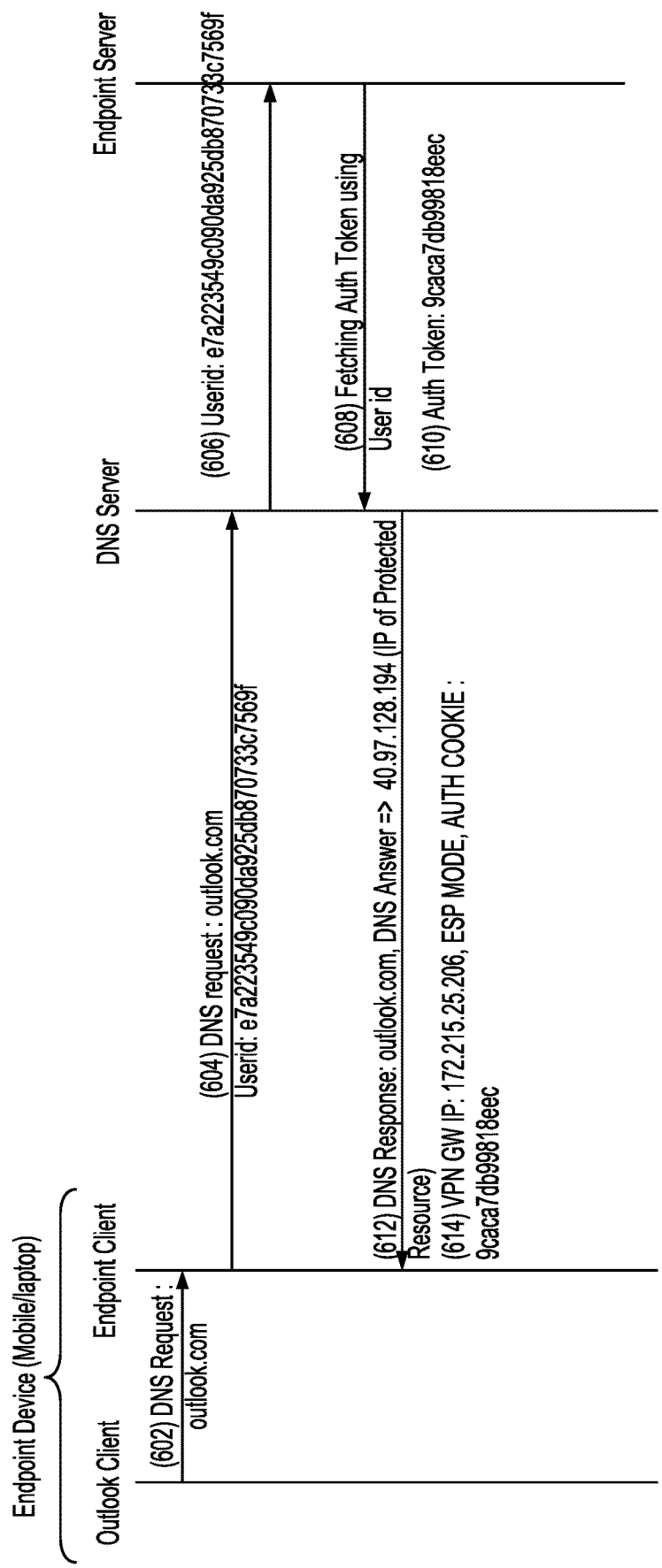
FIGS. 6A-6C are protocol sequence diagrams showing exchanges of requests/responses between the endpoint client, the endpoint server, and the DNS server for two different example sessions for VPN connections to different applications/services in accordance with some embodiments.
Figure 6B:
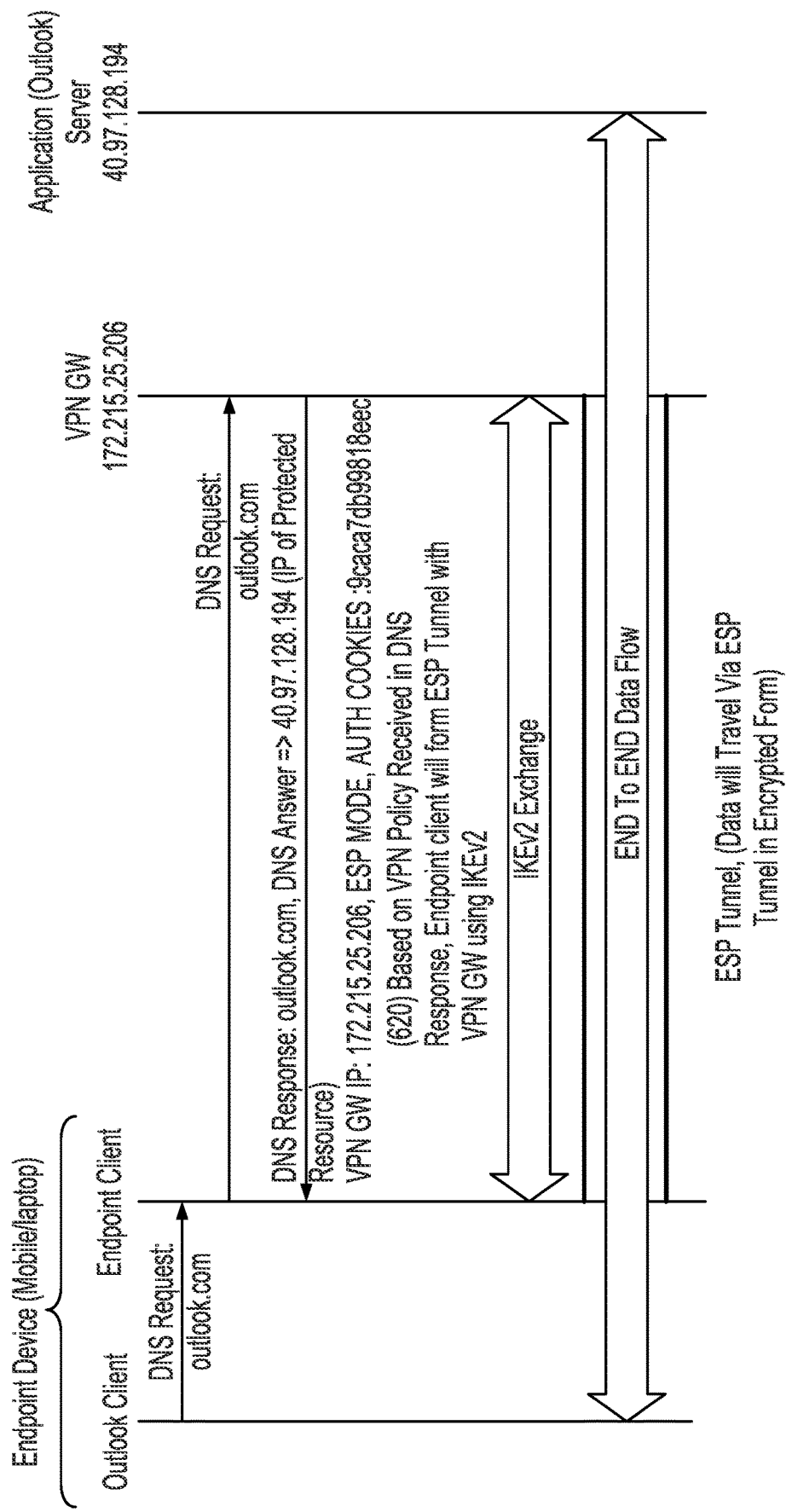
Figure 6C:
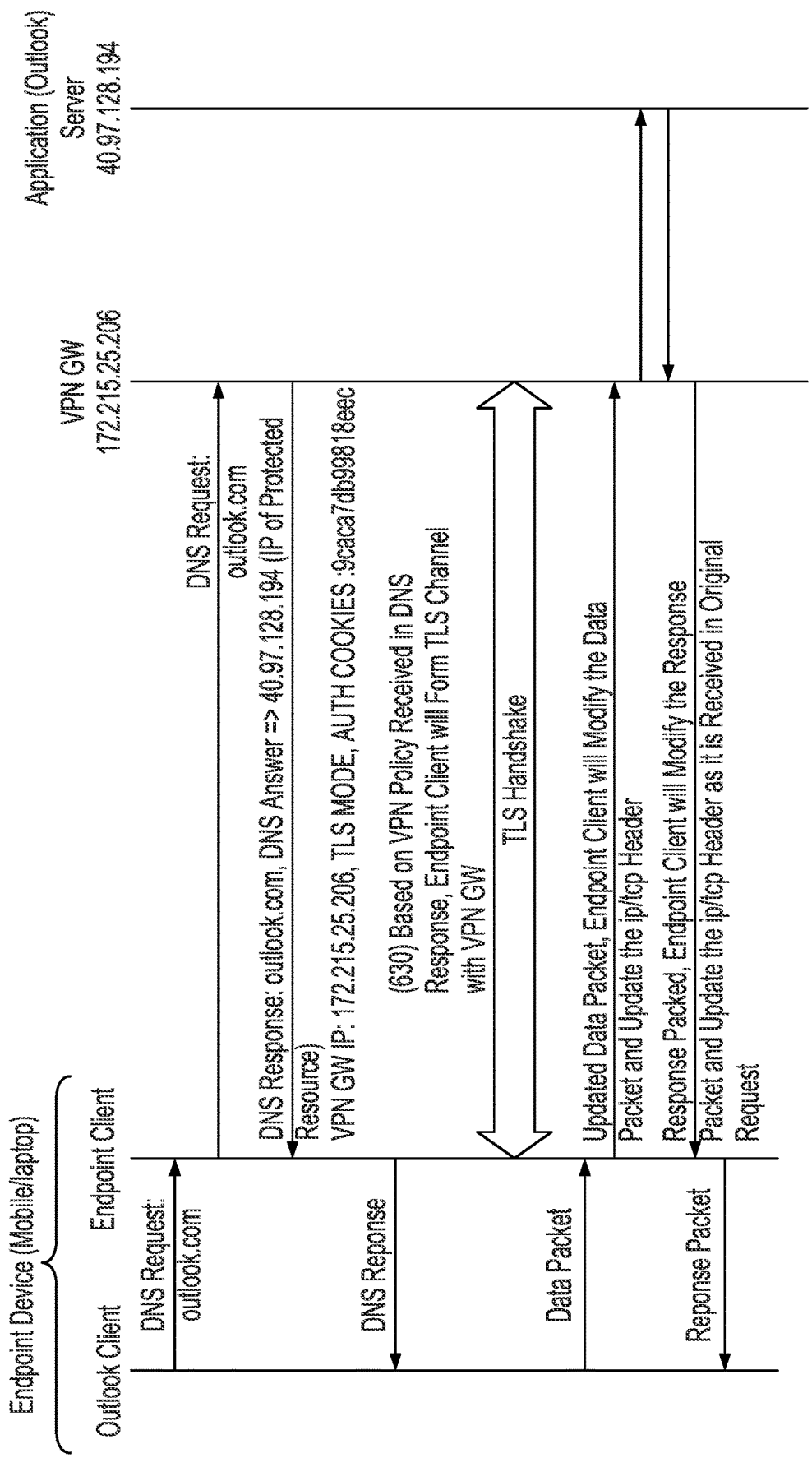

FIGS. 6A-C are protocol sequence diagrams showing exchanges of requests/responses between the endpoint client, the endpoint server, and the DNS server for two different example sessions for VPN connections to different applications/services in accordance with some embodiments.

Referring to FIG. 6A, this protocol sequence diagram illustrates a first stage of processing in which the endpoint client (e.g., endpoint client/device 202 as shown in FIG. 2) obtains the VPN gateway IP address, auth token, and tunnel mode (e.g., TLS or ESP) in a DNS response.

At 602, the Outlook client executing on the endpoint client initiates a DNS request for access to an external resource of outlook.com.

At 604, the endpoint client sends a DNS request for outlook.com to the DNS server. As shown, the DNS request includes User ID information, which in this example is shown as e7a223549c090da925db870733c7569f. As similarly described above, the User ID information can be included as part of the eDNS portion of the DNS request.

At 606, the DNS server sends a request for the new session for User ID e7a223549c090da925db870733c7569f to the endpoint server (e.g., endpoint server 208 as shown in FIG. 2). As similarly discussed above, the DNS server can use an API to communicate with the endpoint server.

At 608, the endpoint server performs a lookup using the User ID information to fetch an auth token for the new session for User ID e7a223549c090da925db870733c7569f.

At 610, the endpoint server sends the fetched auth token shown as 9caca7db99818eec to the DNS server.

At 612, the DNS server sends a DNS response to the endpoint client. The DNS response includes the IP address of the protected resource, which is shown as 40.97.128.194 (IP address of the protected resource—outlook.com).

As shown at 614, the DNS response also includes additional information that includes the following: an IP address of the protected resource for the VPN gateway to access outlook.com—172.215.25.206, as well as the tunneling mode (e.g., ESP MODE in this example), and an AUTH COOKIE—9caca7db99818eec.

Referring to FIG. 6B (ESP tunnel mode), after receiving the VPN rule data in the DNS response as described above with respect to FIG. 6A, as shown at 620, the endpoint client establishes a secure connection with the VPN gateway (GW) using the VPN GW IP address received in the DNS response for secure communications using an ESP tunnel.

In this example implementation, the connection between the VPN GW and the endpoint client can be operated in two modes. In an ESP tunnel mode as shown in FIG. 6B, the endpoint client uses the IKEv2 (RFC 5996) protocol and generates the ESP tunnel mode SA and SP (e.g., security association and security policy). In this ESP mode, when the endpoint client receives the data packet from an application, such as Google Chrome, then the endpoint client encrypts the entire data packet along with the IP and TCP/UDP header, and the endpoint client and the VPN GW act as a bypass agent between the application (e.g., Google Chrome) and the application GW (protected resource), as shown in FIG. 6B.

Referring to FIG. 6C (TLS tunnel mode), after receiving the VPN rule data in the DNS response as described above with respect to FIG. 6A, as shown at 630, the endpoint client establishes a secure connection with the VPN gateway (GW) using the VPN GW IP address received in the DNS response for secure communications using a TLS tunnel.

In this example implementation, in TLS Mode, the endpoint application intercepts all the traffic and removes the IP, TCP/UDP header information, and sends it to the VPN GW. The VPN GW then forwards it to the application server (e.g., Application (outlook) Server at IP address 40.97.128.194 as shown in FIG. 6C). The response generated by the application server travels in the same direction (in reverse order). As such, in this TLS mode, both the endpoint client and the VPN GW act as a proxy agent to facilitate secure communications over the TLS tunnel.

Figure 7:
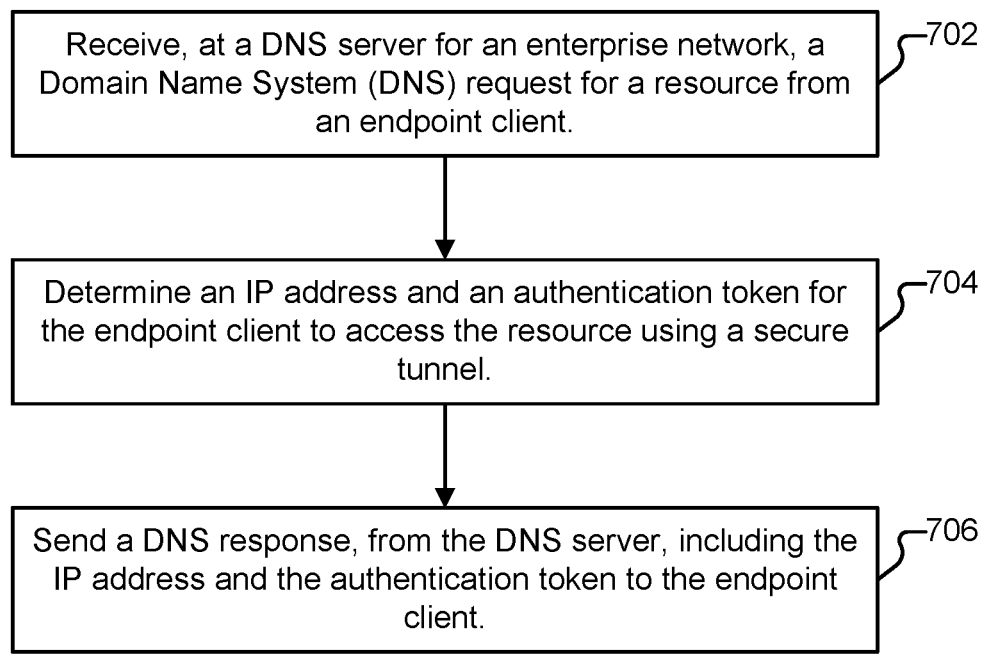
FIG. 7 is a flow diagram illustrating a process for policy-based dynamic VPN profile selection using DNS protocol in accordance with some embodiments.

Process Embodiments for Policy-Based Dynamic VPN Profile Selection Using DNS Protocol FIG. 7 is a flow diagram illustrating a process for policy-based dynamic VPN profile selection using DNS protocol in accordance with some embodiments. In various embodiments, process 700 is performed by the system(s) and processing techniques described above with respect to FIGS. 1 through 6C.

At 702, a Domain Name System (DNS) request for a resource from an endpoint client is received at a DNS server for an enterprise network. For example, the resource can be an external resource, such as a cloud-based application/service (e.g., outlook.com, salesforce.com, etc.).

At 704, an IP address and an authentication token for the endpoint client to access the resource using a secure tunnel are determined. For example, the IP address and the auth token can be fetched from the endpoint server as similarly described above (e.g., with respect to FIGS. 5 and 6A). As another example, the DNS server can be configured to maintain the data store and to generate the auth token (e.g., auth cookie).

At 706, a DNS response is sent from the DNS server to the endpoint client. The DNS response includes the IP address and the authentication token using eDNS options as similarly described above. As such, the endpoint client is not required to maintain a data store of such information locally or to generate such auth tokens locally using an endpoint agent. Moreover, the VPN split tunneling rules/policy can be thereby communicated between the DNS server and the endpoint client using the DNS protocol.

Figure 8:
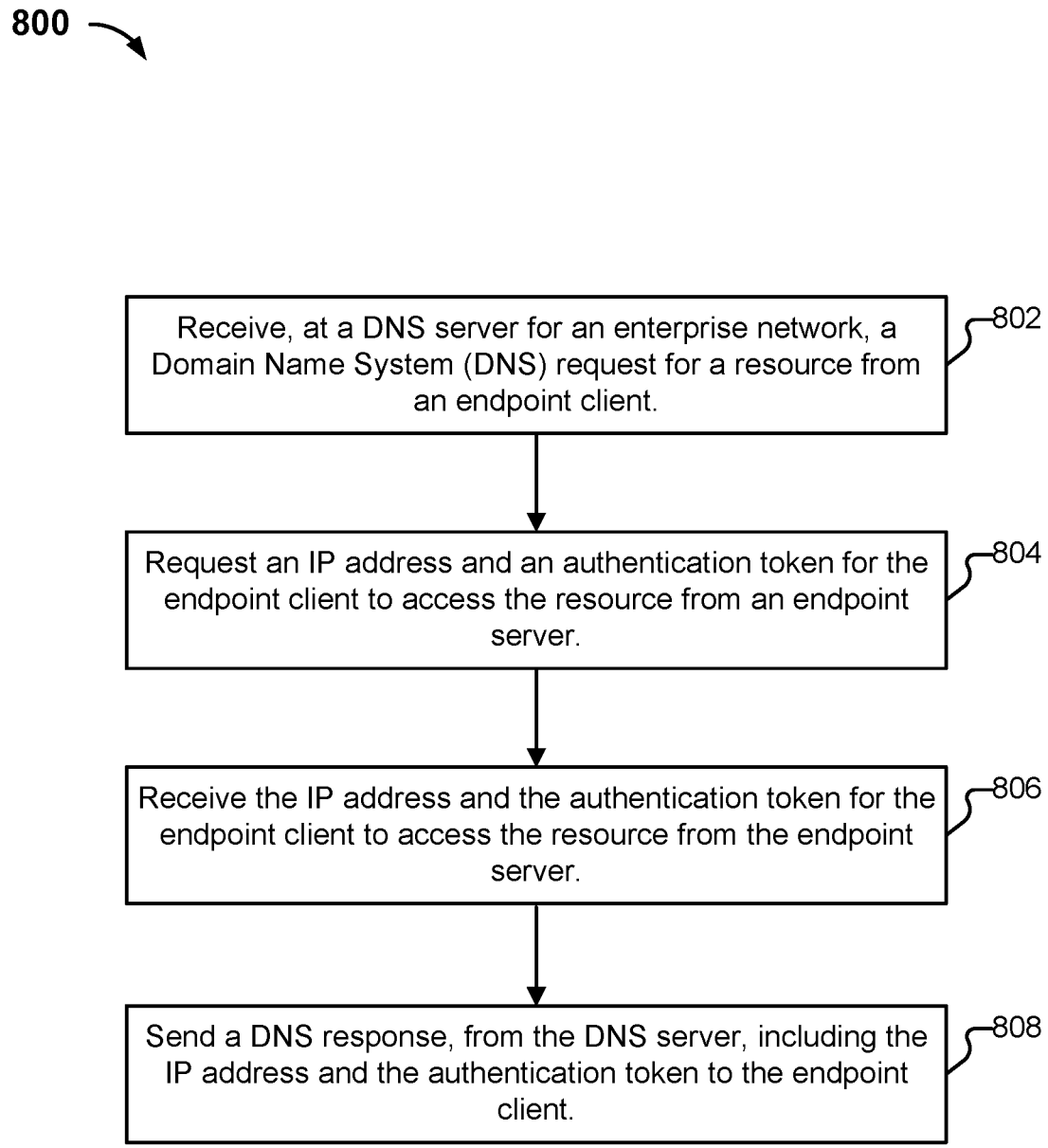
FIG. 8 is a flow diagram illustrating a process for policy-based dynamic VPN profile selection using DNS protocol in accordance with some embodiments.

FIG. 8 is another flow diagram illustrating a process for policy-based dynamic VPN profile selection using DNS protocol in accordance with some embodiments. In various embodiments, process 800 is performed by the system(s) and processing techniques described above with respect to FIGS. 1 through 6C.

At 802, a Domain Name System (DNS) request for a resource from an endpoint client is received at a DNS server for an enterprise network. For example, the resource can be an external resource, such as a cloud-based application/service (e.g., outlook.com, salesforce.com, etc.).

At 804, an IP address and an authentication token for the endpoint client to access the resource using a secure tunnel are requested from an endpoint server. In an example implementation, the IP address and the auth token can be fetched from the endpoint server using an API as similarly described above (e.g., with respect to FIGS. 5 and 6A). The policy can also be configured to include geography/location and time-based settings. As an example, users in the United States, Europe, and Asia can be configured to use distinct VPN gateways to access the resource. Another example is the expiration of the authentication token (e.g., a time to live (TTL) setting can be included in the eDNS options).

At 806, the IP address and the authentication token for the endpoint client to access the resource using a secure tunnel are received from the endpoint server. For example, the IP address and the auth token can be fetched from the endpoint server using the API as similarly described above (e.g., with respect to FIGS. 5 and 6A).

At 808, a DNS response is sent from the DNS server to the endpoint client. The DNS response includes the IP address and the authentication token using eDNS options as similarly described above. As such, the endpoint client is not required to maintain a data store of such information locally or to generate such auth tokens locally using an endpoint agent. Moreover, the VPN split tunneling rules/policy can be thereby communicated between the DNS server and the endpoint client using the DNS protocol.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive, at a DNS server for an enterprise network, a Domain Name System (DNS) request for a resource from an endpoint client, wherein the DNS request includes a Fully Qualified Domain Name (FQDN) and a client ID associated with the endpoint client;
    determine an Internet Protocol (IP) address and an authentication token for the endpoint client to access the resource using a secure tunnel, wherein the DNS server, via an authentication request including the FQDN and the client ID, requests the authentication token from an endpoint server, wherein the endpoint server identifies a set of authentication tokens based on a first client ID or a second client ID, determines the authentication token from the set of authentication tokens based on the FQDN, and returns the IP address and the authentication token to the DNS server; and send a DNS response, from the DNS server, including the IP address and the authentication token to the endpoint client; and a memory coupled to the processor and configured to provide the processor with instructions.

2. The system recited in claim 1, wherein the authentication token includes an authentication cookie.

3. The system recited in claim 1, wherein the IP address and the authentication token are determined based on a policy for dynamic Virtual Private Network (VPN) profile selection using DNS protocol.

4. The system recited in claim 1, wherein the IP address and the authentication token are determined based on a policy for dynamic VPN profile selection using DNS protocol to facilitate DNS-based split tunneling.

5. The system recited in claim 1, wherein the IP address and the authentication token are determined based on a policy for dynamic VPN profile selection using DNS protocol, and wherein the policy includes a plurality of VPN rules that can be updated at runtime for dynamic VPN gateway allocation for a plurality of endpoint clients associated with the enterprise network.

6. The system recited in claim 1, wherein the authentication token is generated at the endpoint server for each new session associated with the endpoint client.

7. A method, comprising:

receiving, at a DNS server for an enterprise network, a Domain Name System (DNS) request for a resource from an endpoint client, wherein the DNS request includes a Fully Qualified Domain Name (FQDN) and a client ID associated with the endpoint client;

determining an IP address and an authentication token for the endpoint client to access the resource using a secure tunnel, wherein the DNS server, via an authentication request including the FQDN and the client ID, requests the authentication token from an endpoint server, wherein the endpoint server identifies a set of authentication tokens based on a first client ID or a second client ID, determines the authentication token from the set of authentication tokens based on the FQDN, and returns the IP address and the authentication token to the DNS server; and sending a DNS response, from the DNS server, including the IP address and the authentication token to the endpoint client.

8. The method of claim 7, wherein the authentication token includes an authentication cookie.

9. The method of claim 7, wherein the IP address and the authentication token are determined based on a policy for dynamic Virtual Private Network (VPN) profile selection using DNS protocol.

10. The method of claim 7, wherein the IP address and the authentication token are determined based on a policy for dynamic VPN profile selection using DNS protocol to facilitate DNS-based split tunneling.

11. The method of claim 7, wherein the IP address and the authentication token are determined based on a policy for dynamic VPN profile selection using DNS protocol, and wherein the policy includes a plurality of VPN rules that can be updated at runtime for dynamic VPN gateway allocation for a plurality of endpoint clients associated with the enterprise network.

12. The method of claim 7, wherein the authentication token is generated at the endpoint server for each new session associated with the endpoint client.

13. A computer program product embodied in a non-transitory computer readable medium and comprising computer instructions for:

receiving, at a DNS server for an enterprise network, a Domain Name System (DNS) request for a resource from an endpoint client, wherein the DNS request includes a Fully Qualified Domain Name (FQDN) and a client ID associated with the endpoint client;

determining an IP address and an authentication token for the endpoint client to access the resource using a secure tunnel, wherein the DNS server, via an authentication request including the FQDN and the client ID, requests the authentication token from an endpoint server, wherein the endpoint server identifies a set of authentication tokens based on a first client ID or a second client ID, determines the authentication token from the set of authentication tokens based on the FQDN, and returns the IP address and the authentication token to the DNS server; and sending a DNS response, from the DNS server, including the IP address and the authentication token to the endpoint client.

14. The computer program product of claim 13, wherein the authentication token includes an authentication cookie.

15. The computer program product of claim 13, wherein the IP address and the authentication token are determined based on a policy for dynamic Virtual Private Network (VPN) profile selection using DNS protocol.

16. The computer program product of claim 13, wherein the IP address and the authentication token are determined based on a policy for dynamic VPN profile selection using DNS protocol to facilitate DNS-based split tunneling.

17. The computer program product of claim 13, wherein the IP address and the authentication token are determined based on a policy for dynamic VPN profile selection using DNS protocol, and wherein the policy includes a plurality of VPN rules that can be updated at runtime for dynamic VPN gateway allocation for a plurality of endpoint clients associated with the enterprise network.

* * * * *